(12) United States Patent
Tsai et al.

(10) Patent No.: US 8,606,387 B2
(45) Date of Patent: Dec. 10, 2013

(54) ADAPTIVE AND AUTOMATIC DETERMINATION OF SYSTEM PARAMETERS

(75) Inventors: Po-Feng Tsai, Taipei (TW); Chia-Tong Ho, Taipei (TW); Sunny Wu, Zhudong Town (TW); Jo Fei Wang, Hsinchu (TW); Jong-I Mou, Hsinpu Township (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 329 days.

(21) Appl. No.: 13/006,571

(22) Filed: Jan. 14, 2011

(65) Prior Publication Data

US 2012/0130525 A1    May 24, 2012

Related U.S. Application Data

(60) Provisional application No. 61/415,047, filed on Nov. 18, 2010.

(51) Int. Cl.
*G06F 19/00*    (2011.01)

(52) U.S. Cl.
USPC ............................ 700/108; 257/724; 702/136

(58) Field of Classification Search
USPC ............................ 700/108; 257/724; 702/136
See application file for complete search history.

(56) References Cited

U.S. PATENT DOCUMENTS

| | | | | |
|---|---|---|---|---|
| 2005/0093145 | A1* | 5/2005 | Briancon et al. | 257/724 |
| 2006/0241891 | A1* | 10/2006 | Kaushal et al. | 702/136 |
| 2008/0228308 | A1* | 9/2008 | Phelps | 700/121 |
| 2009/0080759 | A1* | 3/2009 | Bhaskar et al. | 382/141 |
| 2009/0254572 | A1* | 10/2009 | Redlich et al. | 707/10 |
| 2010/0250497 | A1* | 9/2010 | Redlich et al. | 707/661 |
| 2011/0012635 | A1* | 1/2011 | Lu et al. | 324/757.03 |

* cited by examiner

*Primary Examiner* — Mohammad Ali
*Assistant Examiner* — Anthony Whittington
(74) *Attorney, Agent, or Firm* — Lowe Hauptman & Ham, LLP

(57) ABSTRACT

A MIMO optimizer is used to identify tunable process parameters for processing equipment.

20 Claims, 9 Drawing Sheets

| $X_i$ (PARAMETER) | $X_{iuL}$ (UPPER LIMIT) | $X_{it}$ (TARGET) | $X_{iLL}$ (LOWER LIMIT) |
|---|---|---|---|
| $X_1$ | $X_{1uL}$ | $X_{1t}$ | $X_{1LL}$ |
| $X_2$ | $X_{2uL}$ | $X_{2t}$ | $X_{2LL}$ |
| . . . | . . . | . . . | . . . |
| $X_N$ | $X_{NuL}$ | $X_{NT}$ | $X_{NLL}$ |

FIG. 1B

| $Y_j$ (MONITOR) | $Y_{juL}$ (UPPER LIMIT) | $Y_{jt}$ (TARGET) | $X_{jLL}$ (LOWER LIMIT) |
|---|---|---|---|
| $Y_1$ | $Y_{1uL}$ | $Y_{1t}$ | $Y_{1LL}$ |
| $Y_2$ | $Y_{2uL}$ | $Y_{2t}$ | $Y_{2LL}$ |
| . . . | . . . | . . . | . . . |
| $Y_M$ | $Y_{MuL}$ | $Y_{MT}$ | $Y_{MLL}$ |

FIG. 1C

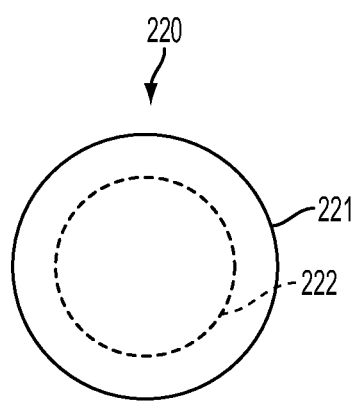
FIG. 2B
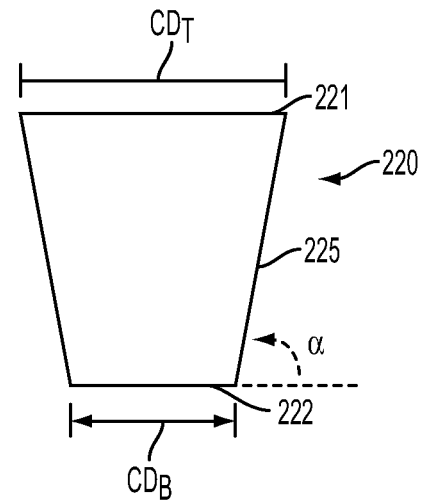
FIG. 2C
|   | T | P | RF | VB | $F_1$ | $F_2$ | .. |
|---|---|---|----|----|-------|-------|----|
| 1 | $T_1$ | $P_1$ | $RF_1$ | $VB_1$ | $(F1)_1$ | $(F2)_1$ | .. |
| 2 | $T_2$ | $P_2$ | $RF_2$ | $VB_2$ | $(F1)_2$ | $(F2)_2$ | .. |
| 3 | $T_3$ | $P_3$ | $RF_3$ | $VB_3$ | $(F1)_3$ | $(F2)_3$ | .. |
| . | . | . | . | . | . | . | . |
FIG. 2D

ADAPTIVE AND AUTOMATIC DETERMINATION OF SYSTEM PARAMETERS

CROSS-REFERENCE TO RELATED APPLICATIONS

The present application claims priority of U.S. Provisional Patent Application Ser. No. 61/415,047, filed on Nov. 18, 2010, which is incorporated herein by reference in its entirety.

TECHNICAL FIELD

This disclosure relates generally to processing equipment, and more particularly, to tuning of parameters of processing equipment.

BACKGROUND

The integrated circuits have experienced continuous rapid growth due to constant improvements in the integration density of various electronic components (i.e., transistors, diodes, resistors, capacitors, etc.). For the most part, this improvement in integration density has come from repeated reductions in minimum feature size, allowing more components to be integrated into a given chip area. Manufacturing of integrated circuits requires usages of a number of processing and monitoring equipment (tools) for processes, such as deposition, etching, photolithography, implant, planarization, etc. To produce devices and interconnect with reduced sizes, the manufacturing processes need to be highly repeatable and produce substrates that meet the stringent specification to have good yield, electrical, and reliability performance.

Manufacturing equipment needs to be regularly shut down to be maintained for improving proves control and replacing old/failed parts. After maintenance, the manufacturing equipment needs to be started up again and be qualified to be in production. Restarting and qualifying a tool could be quite challenging and time-consuming for advanced manufacturing.

BRIEF DESCRIPTION OF THE DRAWINGS

The present disclosure will be readily understood by the following detailed description in conjunction with the accompanying drawings, and like reference numerals designate like structural elements.

FIG. 1B shows a table of tunable process parameters, in accordance with some embodiments.

FIG. 1C shows a table of process monitors, in accordance with some embodiments.

FIG. 2B shows a top view of a via, in accordance with some embodiments.

FIG. 2C shows a cross-sectional view of a via, in accordance with some embodiments.

FIG. 2D shows a table of simulation results with top few process parameters that could produce a minimized object function, in accordance with some embodiments.

DETAILED DESCRIPTION OF THE EXEMPLARY EMBODIMENTS

Figure 1A:
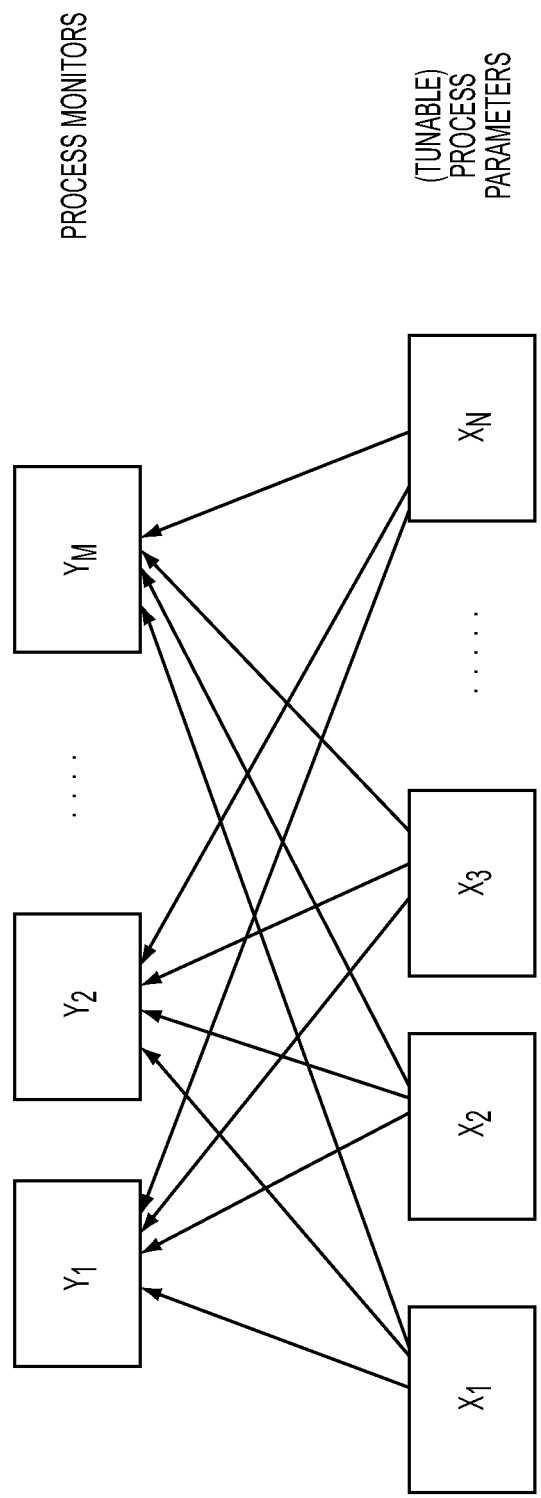
FIG. 1A show a schematic diagram of a number of tunable process parameters with correlating process monitors of process equipment, in accordance with some embodiments.

It is to be understood that the following disclosure provides many different embodiments, or examples, for implementing different features. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Semiconductor processing equipment is used to process substrates (or wafer) to form integrated circuit. Examples of semiconductor processing equipment may include, but not are not limited to, equipment for chemical vapor deposition (CVD), physical vapor deposition (PVD), lithography, implant, etching, annealing, thermal oxidation, chemical-mechanical planarization (CMP), cleaning, etc. For advanced device manufacturing that often forms devices with decreasing minimal feature sizes, thinner gate dielectric film, shallower junction depth, higher device density, and more interconnection, the performance of semiconductor processing equipment is expected to be higher. For example, the deposition, planarization, dopant, etching, and/or patterning uniformities need to be higher than older technologies to ensure higher density of devices would work across the entire 12 inch or 18 inch wafers.

To ensure high yield of high density devices, additional process monitoring with more stringent requirements is established for processing equipment. For example, for an inter-metal dielectric (IMD) low dielectric (low-K) film deposition, the process control monitors may include, but are not limited to, thickness, thickness uniformity, dopant concentration (if the IMD low-K film is doped), reflective index, etc. The specifications for such process control monitors become more and more stringent. For example, the thickness uniformity requirement could be tighter for 28 nm technology than for 40 nm and above technologies.

Process equipment requires routine and/or non-routine maintenance due to process drift or failure/aging of parts. After the equipment is serviced (or maintained), the process equipment needs to be brought back up and be qualified for production. Each process equipment has many process parameters. For example, plasma etching equipment may have tunable process parameters, such as heater power (to adjust process temperature), vacuum power setting (to adjust chamber pressure), radio-frequency (RF) power, bias power, distance between substrate and top electrode, process gas flow rates, etc. All these parameters need to be tuned properly to ensure they etching equipment will produce desired results.

FIG. 1A show a schematic diagram of a number of tunable process parameters with correlating process monitors of process equipment, in accordance with some embodiments. FIG. 1A shows that there are $X_1, X_2, X_3, \ldots X_N$ tunable process parameters for the equipment. As described in the example, above, $X_1$ could be heater power, $X_2$ could be vacuum power setting, and $X_3$ could be RF power, etc. for an etcher. For an etcher, the process monitors, $Y_1, Y_2, \ldots Y_M$, may include etch rate, etch uniformity, critical dimensions (CD) of the etched features, and profiles of the etched features, etc. Each tunable process parameter, such as $X_1, X_2, \ldots, X_N$, may directly or indirectly affect the outcome of each process monitor, such as $Y_1, Y_2, \ldots Y_M$.

As mentioned above, older process technologies have fewer process monitors with less stringent requirements and have wider process windows. As a result, it is relatively easy for a technician or engineer to manually tune the process parameters to bring up the process equipment and to qualify the equipment to be a production tool. For advanced manufacturing tools (or equipment), the process tuning after maintenance or repair becomes harder and more time-consuming due to the tighter process control and additional monitors. The matrix 1 below shows a linear inter-relationships between the process monitors, $Y_1 \ldots, Y_M$ and tunable process parameters, $X_1, \ldots, X_N$, in accordance with some embodiments.

$$Y_1 = A_{11}X_1 + A_{12}X_2 + A_{13}X_3 + \ldots + A_{1N}X_N$$
$$Y_2 = A_{21}X_1 + A_{22}X_2 + A_{23}X_3 + \ldots + A_{2N}X_N$$
$$\ldots$$
$$Y_M = A_{M1}X_1 + A_{M2}X_2 + A_{M3}X_3 + \ldots + A_{MN}X_N$$

Matrix 1

Engineers involved in developing the process recipe(s) for processing equipment often have an overall understanding of the relationships between the process monitors, $Y_1 \ldots, Y_m$ and tunable process parameters, $X_1, \ldots, X_N$. In some embodiments, the relationships understood by the engineers are relatively simple with key process monitors, $Y_1 \ldots, Y_m$, have linear relationships with key process parameters, $X_1, \ldots, X_N$. For example, a simple relationship (as shown below in Equation (1)) could be defined between $Y_1, X_2$, and $X_4$, with other process parameters playing minor roles. The relationships are often recorded as references for engineers, technicians and/or operators associated with the processing equipment.

$$Y_1 = A_{12}X_2 + A_{14}X_4 \quad (1)$$

Coefficients $A_{12}$ and $A_{14}$ are sensitivity coefficients. They indicate how process monitor Y1 is affected by tunable process parameters, $X_2$ and $X_4$ respectively. Sensitivity coefficients may be positive or negative. The higher the absolute value of the sensitivity coefficient is, the more sensitive the process monitor is toward the process parameter. For example, if $A_{12}$ has a high value, then $Y_1$ is affected strongly by $X_2$. For tunable process parameters that are not shown in equation (1), $Y_1$ is not (or almost not) affected by those process parameters. The matrix 1 above is a sensitivity matrix (or table) between process monitors and tunable process parameters. In some embodiments, the relationship between the process monitors $(Y_1, \ldots, Y_M)$ and process parameters $(X_1, \ldots, X_N)$ may be non-linear.

Maintenance of processing equipment could include cleaning the interior walls and/or parts of the processing chambers to remove residues or deposited films on the interior walls and/or parts. For example, chamber walls and downstream exhaust of a plasma enhanced chemical vapor deposition (PECVD) for a dielectric film deposition could be deposited with the dielectric film, which can flake off to cause particle problems if the film becomes too thick. As a result, the equipment is regularly shut down for maintenance after a period of time. During the maintenance, the interior walls and other parts of the equipment that are deposited with the dielectric film are cleaned. The cleaning could make the chamber interior behave very differently compared to before the cleaning. In addition, when the parts of the equipment are taken off and then put back, with some parts replaced for serviced, the characteristics of the equipment could change. Therefore, simply dialing in the tunable processing parameters from before the maintenance might not yield the same performance results. As a result, tuning of the processing parameters $(X_1, \ldots, X_N)$ become necessary to make all process monitors $(Y_1, \ldots, Y_M)$ meeting the specifications.

FIG. 1B shows a table 100 of tunable process parameters, $X_1 \ldots, X_N$, in accordance with some embodiments. Each tunable parameter, Xi, may have an upper limit ($Xi_{UL}$), a target value ($Xi_T$), and a lower limit ($Xi_{LL}$). In some embodiments, the target value $Xi_T$ is a value established for equipment (or system) based previous process data or knowledge. FIG. 1C shows a table 130 of process monitors, $Y_1 \ldots, Y_M$, in accordance with some embodiments. Each process monitor, Yj, may have an upper limit ($Yj_{UL}$), a target value ($Yj_T$), and a lower limit ($Yj_{LL}$). In some embodiments, the target value $Yj_T$ is a value based on specifications. Process monitors, Yj, need to meet the specification for the equipment to produce desired results. During equipment tuning (or qualification), process parameters may be tuned between the upper and lower limits. The changes in process parameters, Xj, would result in changes in process monitors, Yj.

System tuning is often done manually. Engineers and/or technicians familiar with the system and processes could conduct some trial-and-error of entering different settings and parameters to make all process monitors meet the specification. For older process technologies such manual tuning is doable, since the process windows for a few process monitors are relatively wide and the manual tuning can be achieved in a reasonable time frame. However, for advanced processing technologies, there are more process monitors, Yj, with narrower windows (or narrower ranges between upper and lower limits). Manual tuning by engineers and technicians become very time consuming. They can spend numerous hours or even up to a couple of days trying to qualify the system(s) for production. Further, each engineer or technician has different way of tuning process equipment. Different equipment qualified (or tuned) by different technical personnel might meet the specifications of the process monitors via different tuning knobs. Over a period of time, different equipment could drift differently. Therefore, equipment (or system) turning could reveal a human factor and equipment performance could vary depending on the equipment tuner.

Figure 1D:
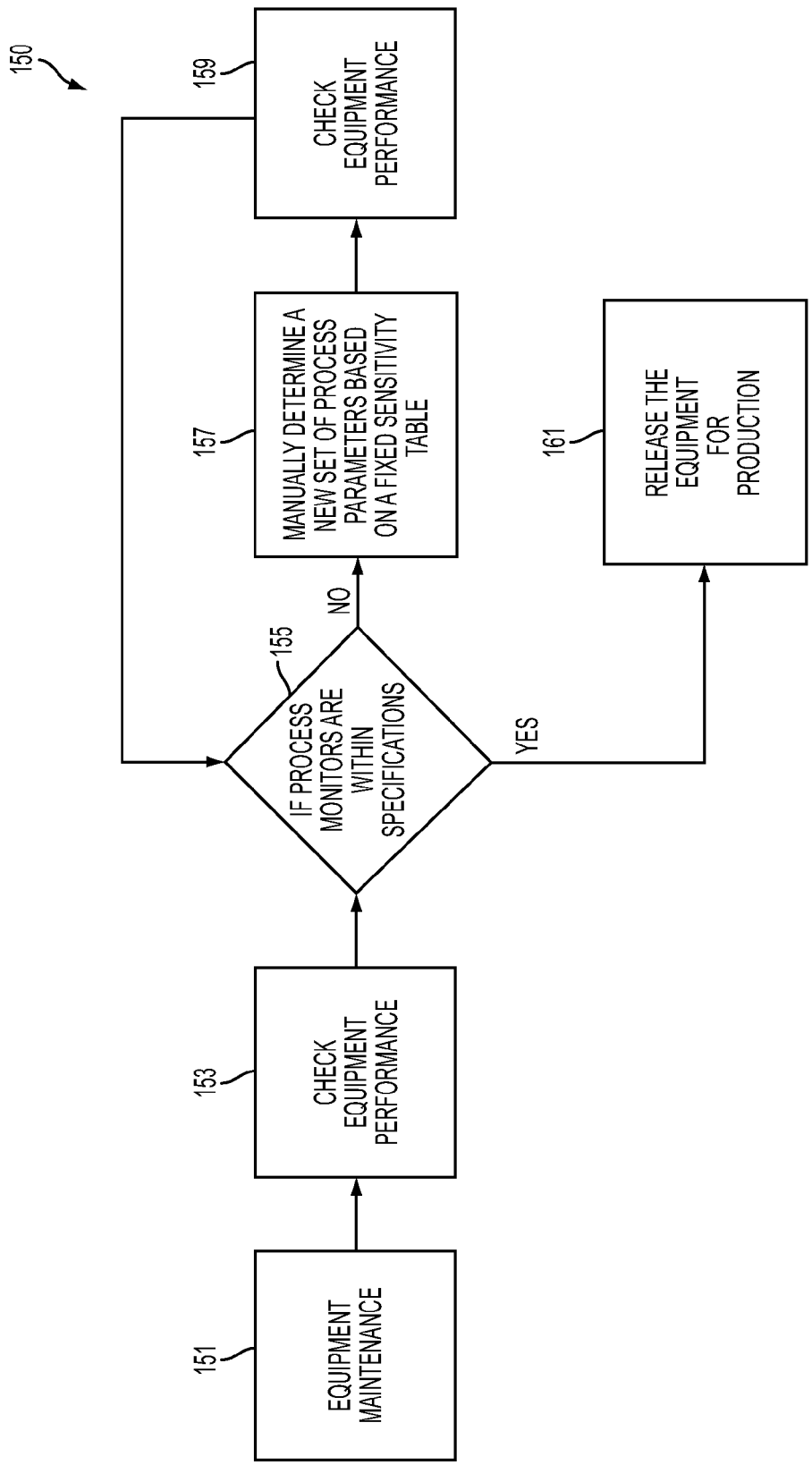
FIG. 1D shows a process flow of process tuning for process equipment after maintenance, in accordance with some embodiments.

FIG. 1D shows a process flow 150 of process tuning for process equipment after maintenance, such as a preventive maintenance (PM), in accordance with some embodiments. After PM 151, process parameters, which may include equipment settings, are entered at operation 153 to check the performance of the equipment. The performance of the equipment is checked by collecting process monitor data. One or more wafers can be processed with a process recipe and then measured to collect process monitor data, such as thickness, thickness uniformity, dopant concentration for deposition equipment, or etch rate, critical dimensions for etching equipment. At operation 155, a decision is made to determine whether the process monitors (or process monitor data) pass the process monitoring criteria. If the answer is yes, the equipment (or tool) is released for production at operation 161. If the answer is no, one or more engineers and/or technicians would review the process monitor data and conduct manual tuning by using an available sensitivity matrix (or sensitivity table), such as Matrix 1 shown above. At operation 157, the engineer and/or technician (or manually) determine a new set of tunable process parameters that they consider would likely bring the process monitors within or closer to the process monitor specifications. The parameters could be determined by comparing the latest process monitor data with the specification (or far off the data are) and also based on the sensitivity matrix (or table) available.

After the new set of process parameters are determined, the new process parameters are entered into the system at operation 159 to check the performance of the equipment. As mentioned above, the performance of the equipment could be checked by collecting process monitor data by running one or more wafers through the process chamber with a process recipe. After the process monitor data are collected, the process flow routes to operation 155 to determine whether the process monitors are within the specifications or not. The process parameter tuning process continues until all process monitors are within specification. As mentioned above, for advanced processing technologies with increased process monitors and tighter control limits (or process monitor specifications), the tuning process can take a long time. In addition, the sensitivity matrix (or table) that correlates the process parameters and the process monitors are fixed. Process equipment could behave differently after a major maintenance in a manner similar to how a car would stop differently after a new brake has been installed. Further, semiconductor fabrication (or manufacturing) facilities (fabs) often need a number of process equipment (or tools) for each process operations. For example, there could a number of CVD tools for depositing inter-level dielectric (ILD) films. A fixed sensitivity matrix cannot adjust to the new changes to the system and also does not take differences in individual equipment into consideration.

Figure 2A:
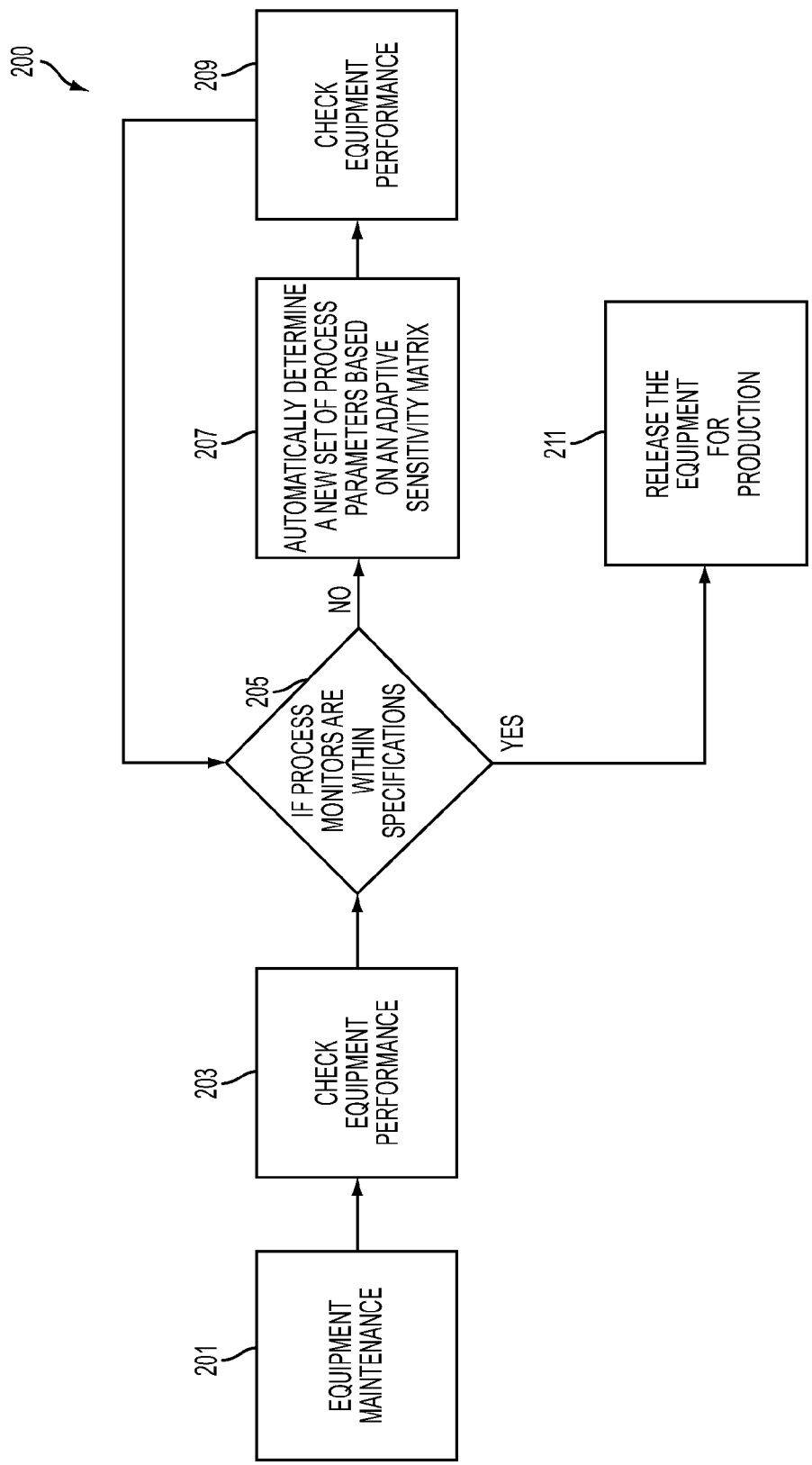
FIG. 2A shows a process flow of process tuning for process equipment after maintenance, in accordance with some embodiments.

FIG. 2A shows a process flow 200 of process tuning for process equipment after maintenance, such as a preventive maintenance (PM), in accordance with some embodiments. Process flow 200 is similar to process flow 150 overall with operations 201, 203, 205, 209, and 211 being similar to operations 151, 153, 155, 159, and 161, respectively. The main difference between process flows 200 and 150 is at operation 207. If the process monitors are not within specifications in process flow 200, a computer system would automatically generate a new set of process parameters based on an adaptive sensitivity matrix (or table). In process flow 150, the engineer and/or technician determine a new set of process parameters that they think would move the process monitors within (or closer to be within) the specification. However, manually determining a new set of process parameters that would work (or move process monitors closer or within specifications) is easier to succeed when there are only a few process monitors with wider process windows (or loose specifications). For advanced process technologies, utilizing computers to find a new set of process parameters would be more efficient. FIG. 1A and Matrix 1 show the interrelationships between the process monitors ($Y_1, \ldots, Y_M$) with process parameters ($X_1, \ldots, X_N$). Simulation tools that deals with optimization of multiple inputs and multiple outputs (MIMO) could to used to obtain a new set of process parameters more accurately and faster than human estimation and/or calculation.

MIMO optimization refers to minimization or maximization with multiple criteria (outputs) and multiple variables (inputs). MIMO optimization can be applied to outputs and inputs with linear relationships or non-linear relationships. The relationships between outputs (process monitors, Yj) and inputs (process parameters, Xi) shown in Matrix 1 is linear. However, as mentioned above, the relationships may be non-linear. Using via etching as an example, via etching forms vias after the etching process. FIG. 2B shows a top view of a via 220 and FIG. 2C shows a side view of the via 220, in accordance with some embodiments. The ideal profile of the via 220 has straight side walls 225. However, sometimes the post-etch via profile has a side wall angle (SWA), $\alpha$, which is not 90 degree (not straight walls). FIGS. 2B and 2C show a top critical dimension ($CD_T$) with an outline 221 of via 220 and a bottom critical dimension ($CD_B$) with an outline 222. For a controlled etching process, there are targeted values for CDT, CDB and SWA (or $\alpha$). In addition to these 3 process monitors, there could be other etch monitors, such as etch rate (ER), etch uniformity (EU), etc.

MIMO optimization requires an optimization object function. Equation (2) shows an exemplary object function for via etch equipment described above.

$$\text{Optimization Object Function(OOF)} = \text{Min}(|\Delta CD_T| + |\Delta CD_B| + |\Delta SWA| + |\Delta ER| + |\Delta EU| + \ldots) \quad (2)$$

$CD_T$, $CD_B$, SWA, ER, EU are all process monitors. They are dependent on different numbers of process parameters, such as temperature (T), chamber pressure (P), plasma power (RF), substrate bias ($V_B$), gas flow rates of process gases ($F_1$, $F_2$, ...), etc. The dependence of these process monitors are expressed in a Matrix 2 shown below:

$$CD_T = B_{11}T + B_{12}P + B_{13}RF + B_{14}V_B + B_{15}F_1 + B_{16}F_2 + \ldots ,$$
$$CD_B = B_{21}T + B_{22}P + B_{23}RF + B_{24}V_B + B_{25}F_1 + B_{26}F_2 + \ldots ,$$
$$SWA = B_{31}T + B_{32}P + B_{33}RF + B_{34}V_B + B_{35}F_1 + B_{36}F_2 + \ldots ,$$
$$ER = B_{41}T + B_{42}P + B_{43}RF + B_{44}V_B + B_{45}F_1 + B_{46}F_2 + \ldots ,$$
$$EU = B_{51}T + B_{52}P + B_{53}RF + B_{54}V_B + B_{55}F_1 + B_{56}F_2 + \ldots ,$$
$$\ldots$$

Matrix 2

$\Delta CD_T$ reflects the difference between a measured $CD_T$ value and a targeted $CD_T$ value. $|\Delta CD_T|$ is an absolute value of the difference. Similarly, $|\Delta CDB|$, $|\Delta SWA|$, $|\Delta ER|$, and $|\Delta EU|$ are absolute values of differences between measured values and targeted values.

A MIMO optimizer can be used to find optimal values of temperature (T), chamber pressure (P), plasma power (RF), substrate bias ($V_B$), gas flow rates of process gases ($F_1$, $F_2$, ...), etc. Various types of MIMO optimizers may be used. For example, optimizers that use, but are not limited to, Newton's method, genetic method or simulated annealing method may be used. The goal of the MIMO optimizer is to find process parameters that would generate a minimal value of the object function (2) shown above.

In addition to using coefficient matrix 2 shown above in the MIMO optimization, boundaries (or limits) of the input parameters (process parameters) and output parameters (process monitors) may be set. As mentioned above, advanced process technologies have tighter specifications for process monitors. Therefore, including the tighter specifications for process monitors is important. Further, setting upper and lower limits of the process parameters are also relevant, since some operation ranges are not practical in real-life or are not possible due to limitations of the system (or equipment). The boundaries or limits for the process monitors and/or process parameters are shown in FIGS. 1C and 1B, which show the upper and lower limits.

In addition to setting the limits for process monitors and/or process parameters, additional constraints may also be placed. For example, if there are more than one process gases, a range of gas ratios of two process gases may be set, such as ratio of gas-A/gas-B be between a lower value and a high value. Such restriction may be needed based on experience of expert(s) of the process and/or equipment. Also, the users (engineers and/or technicians) may place the limit of how far the tuning may go. For example, users may specify that the tuning may not go beyond a certain percentage of a set point, such as a gas flow may only vary within +/−5% of a set point. Such constraints are called "hard" constraints.

In some embodiments, the constraints could be "soft" constraints, which are placed in the object function. For example, the tuning factors maybe weighted to limit the degrees of changes of some parameters. Equation (3) shows a penalty term that can be added to the objection function (2) above for MIMO optimization.

$$\text{Penalty term} = \Sigma W_i * |\Delta X_i| \tag{3}$$

$X_i$ is process parameter "i", such as T, P, RF, $V_B$, $F_1$, and $F_2$ mentioned above. $\Delta X_i$ is the difference between $X_i$ to a target value of $X_i$, and $|\Delta X_i|$ is the absolute value of $\Delta X_i$. $W_i$ is weight factor for $|\Delta X_i|$. If $W_i$ is larger, the $|\Delta X_i|$ needs to be kept small in order to minimize the object function. Similarly, the process parameters can also be weighted. Equation (4) shows the general form of optimization objection function (OOF) with weighted process parameter changes and also process monitor changes.

$$\text{OOF} = \text{Min}(W_a * |\Delta CD_T| + W_b * |\Delta CD_B| + W_c * |\Delta SWA| + W_d * |\Delta ER| + W_e * |\Delta EU| + \ldots + Wi * |\Delta Xi|) \tag{4}$$

$W_a$, $W_b$, $W_c$, ..., $W_e$, etc. are weights for different process monitors. Equation (4) can be reduced to equation (2) by setting $W_a = W_b = W_c \ldots = 1$ and $W_i = 0$.

Further, the user of the MIMO optimizer may specify a number of sets of process parameters needed. For example, the user may want to see top 3 or top 5 optimization results. FIG. 2D shows a table of simulation results with top few process parameters that could produce minimized object function described in equation (4), in accordance with some embodiments. Having a number of possible choices allows users to choose the one that is more suitable for the situation. There could be some restrictions that were not entered into the system previously. User(s) may still use human intelligence to make a final call. When the MIMO optimizer cannot find one or more sets of process parameters that meet all constraints and/or limits, the user(s) can allow the system to find the closest answer(s). MIMO optimization is a simulation, whose results still need to be verified by experiments. Closet answers (or process parameters) may still produce process monitors that fall within the specification. Alternatively, if the optimizer cannot find an answer(s) that is close enough, users may also choose to relax some constraints and/or limits that are deemed less necessary to allow the MIMO optimizer to find the answer(s).

Figure 2E:
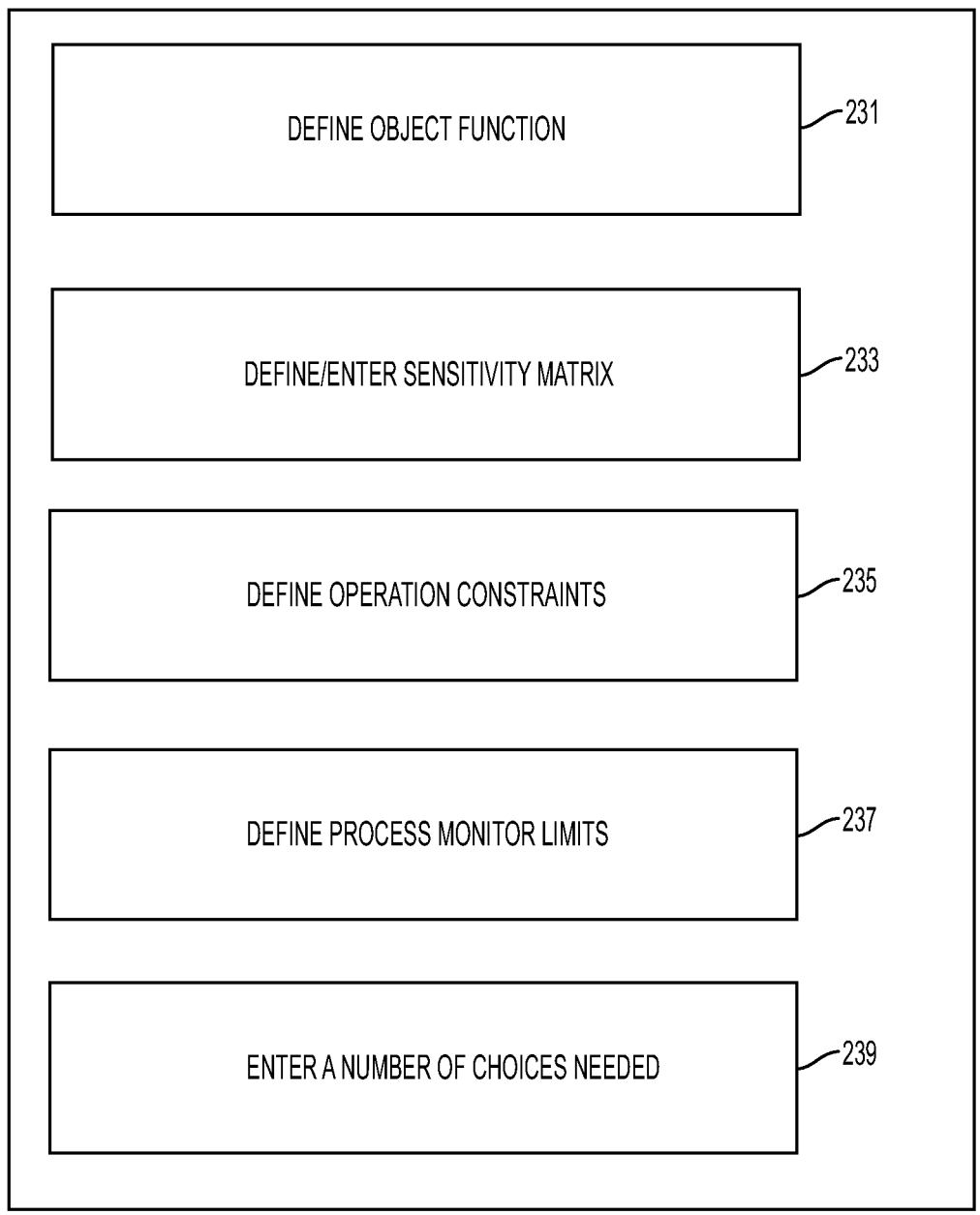
FIG. 2E shows operations and elements needed to create a multi-input-multi-output (MIMO) optimizer, in accordance with some embodiments.

FIG. 2E shows operations and elements needed to create an MIMO optimizer, in accordance with some embodiments. Block 231 shows that an object function, such as equation (2), needs to be defined. Block 233 shows that the sensitivity matrix (or table) between the process monitors and process parameters may be defined or entered. Block 235 shows that operation constrains, such as the hard and/or soft constraints mentioned above, may be defined. As mentioned above, the soft constraints can be added to the object function. Block 237 shows that limits, upper and lower limits, (or specification) of process monitors may be defined. As mentioned above, for advanced process technology, the limits could be relatively tighter than older technologies, which make the MIMO optimization necessary. Bock 239 shows the number of choices (or sets of process parameters) may optionally be entered to allow user(s) define how many options he/she likes to have.

As mentioned above, process equipment may perform differently with time and also may vary from system to system. Using a fixed sensitivity matrix (or table) would make prolong the process of finding the process parameters that could produce process monitors within the process monitor specifications. If the sensitivity matrix can be updated or adjusted from system (or equipment) to system or with current system condition, the sensitivity matrix would be more accurate. A sensitivity matrix that is updated or adjusted based on the past or current process data is adaptive. An adaptive sensitive matrix can correct system to system variation and also take aging and/or maintenance into consideration.

Figure 3:
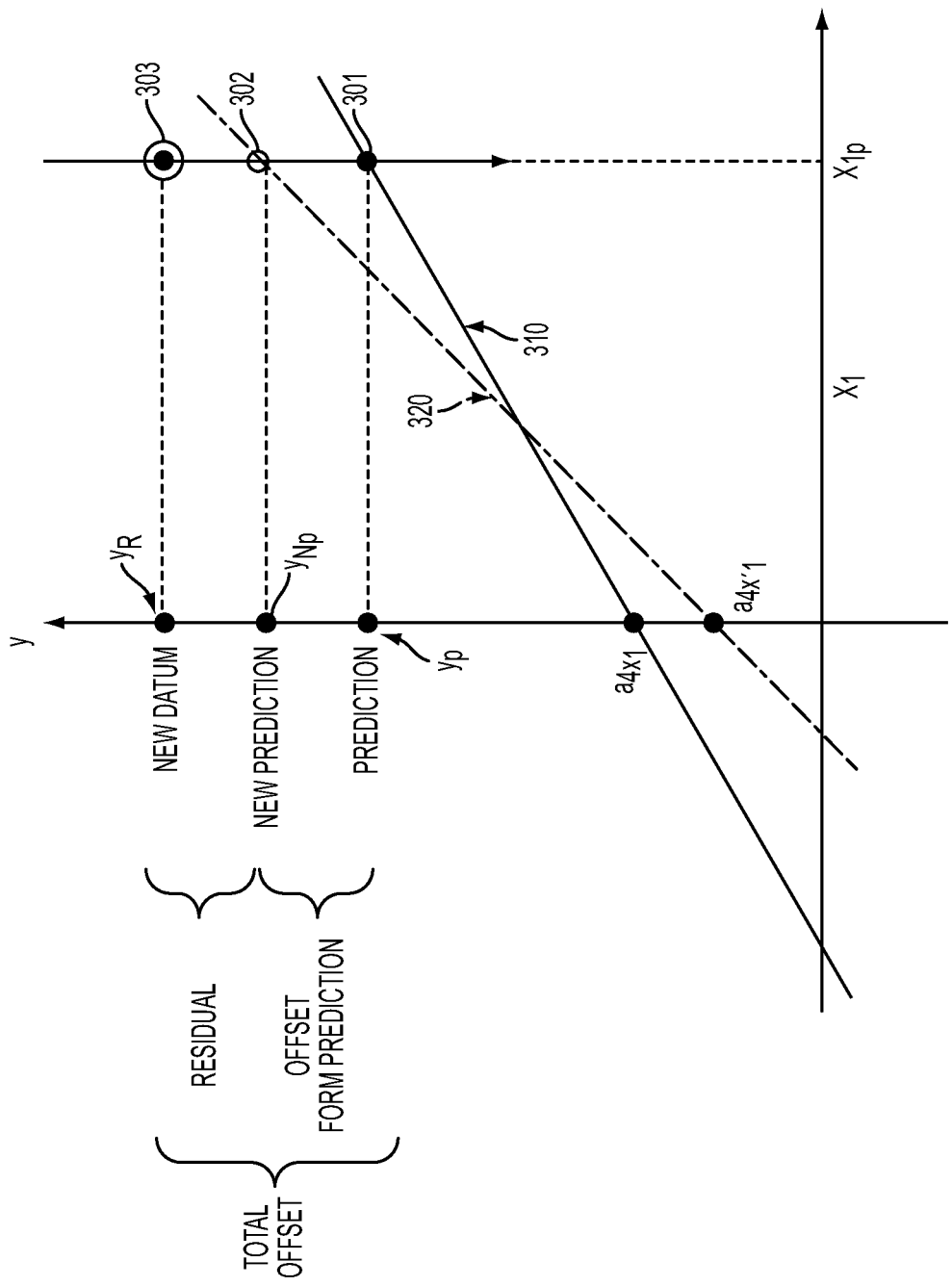
FIG. 3 shows a diagram of a process monitor y versus a process parameter $x_1$, in accordance with some embodiments.

FIG. 3 shows a diagram of a process monitor y versus a process parameter $x_1$, in accordance with some embodiments. Line 310 shows the relationship between y and $x_1$. The slope (or sensitivity of y to $x_1$) of line 310 is "$a_1$" and the intercept is $a_{4x1}$. Equation (5) below shows the relationship between y and parameters, $x_1$, $x_2$, and $x_3$.

$$y = a_1 x_1 + a_2 x_2 + a_3 x_3 + a_4 + \delta \tag{5}$$

$a_1$, $a_2$, and $a_3$ are sensitivity coefficients for $x_1$, $x_2$, and $x_3$ respectively. $a_4$ is the intercept of y when $x_1$, $x_2$, and $x_3$ are all zero. $\delta$ is a residual of y with $x_1$, $x_2$, and $x_3$.

FIG. 3 shows that when $x_1$ is at $x_{1p}$, the predicted y is at point 301 with a value of $y_P$. However, after the process is run, the produced result of y is at point 303 with a value of $y_R$. $y_R$ is higher than $y_P$. The discrepancy between $y_R$ and $y_P$ indicates that model (or equation) used describe the relationship between y and $x_1$ is not quite right and could be modified to produce closer results. Curve 320 on FIG. 3 shows one revised relationship between y and x1 with a new slope $a_1$' and a new intercept of $a_{4x1}$', which would produce a revised (or new) prediction, point 302, of y at $x_{1p}$, with a value of $y_{NP}$, in accordance with some embodiments. The new predicted result, point 302, lies between the predicted result, point 301, and the actual result, point 303. A revised relationship that can predict a result that is closer to the actual datum is likely to be better than the old relationship. The revised relationship can be adjusted to predict a result that matches the actual datum with curve 320 producing $y_R$ at $x_{1p}$. However, severe adjustment may run the risk of over-correcting the model (or relationship). The degree of correction needed for the relationship between y and x1 based on the actual datum, point 303, depends on how reliable the datum point 303 is. If the datum point 303 is very reliable, the model should be adjusted to fully take datum point 303 into consideration and the new prediction, $y_{NP}$, should overlap with datum point 303. In contrast, if the datum point 303 is not very reliable, the new prediction, $y_{NP}$, could be closer to the original prediction, $y_P$, with less consideration of the datum point 303. An exemplary adaptive-learning (self-learning) method for adjusting a relationship between a process monitor, y, with a process parameter, $x_1$, is described below.

To improve a linear relationship between a process monitor y and process parameters, $x_1$, $x_2$, ..., and $x_n$, an energy function E may be expressed below in equation (6), in accordance with some embodiments. An example of the relation ship between y and $x_1$, $x_2$, $x_3$ has been shown above in equation (5).

$$E = (y_R - y_P)^2 \quad (6)$$

A filter can be added to the energy function E to address the reliability issue of the new datum. Equation (7) shows a filtered energy function, E', in accordance with some embodiments.

$$E_t' = \text{Filter}(E_t) = wE_t + (1-w)E_{t-1} \quad (7)$$

In equation (7), the energy function at time "t" is $E_t$, which is weighted by "w". $E_{t-1}$ is energy function at last checking time, t−1. The filtered energy function at time "t", $E_t'$, is exponentially weighted moving average (EWMA) of energy function E. The weight "w", whose value may vary from 0 to 1, is the degree of reliability of the datum y at the current checking time, t. The goal of adaptive-learning (or self-learning) is to find revised relationships between process monitors, such as y, and process parameters, such as $x_1$, $x_2$, .... Such goal may be achieved by finding the minimum of E' (or $E_t'$), as shown below:

$$\text{Min}(E')(\text{or Min}(E_t'))$$

In order to find the best sensitivity coefficients $a_i$, such as $a_1, a_2, \ldots$ in the exemplary equation (5) above, the derivatives of E' with respect to $a_i$ may be taken:

$$\frac{\partial E'}{\partial a_i} = \frac{\partial E'}{\partial y_P} \frac{\partial y_P}{\partial a_i} = -2(y_R - y_P)\Big|_{E'} \frac{\partial y_P}{\partial a_i} \text{ where} \quad (8)$$

$$\frac{\partial y_P}{\partial a_i} = x_i \quad (9)$$

We may define $\Delta a_i$ as:

$$\Delta a_i = a_{i,new} - a_{i,old} \quad (10)$$

$$= -\eta \frac{\partial E'}{\partial a_i}$$

$$= 2\eta * (y_R - y_P)|_{E'} * x_i$$

where η is learning rate coefficient of the equipment and * represents multiplication. By assigning a high η, the learning rate would increase (or accelerate). In contrast, the leaning rate may decelerate when the assigned η value is low. η may depend on a number of factors. For example, it may depend on the process nature. If the process reacts quickly as a function of time, η would be high. If the measurement is reliable, η may also be high. However, if the measurement is not reliable, should be kept low to prevent over-correction of the sensitivity coefficients. In addition, it also depends on if the sensitivity coefficients used are close to reality (accuracy). η is chosen to bring accurate prediction of the process equipment. As a result, $$a_{i,new} = a_{i,old} + \Delta a_i \quad (11)$$

$$= a_{i,old} + 2\eta * (y_R - y_P)|_{E'} * x_i$$

$$= a_{i,old} + \eta' * \text{sgn}(y_R - y_P) * \text{sqrt}(E') * x_i$$

Where $\text{sgn}(y_R - y_P)$ is the sign (+ or −) of the difference of $y_R$ and $y_P$ and η' is equal to 2η. The equation (11) above shows how a new sensitivity coefficient, $a_{i,new}$ may be calculated based on accumulated process data. $a_{i,new}$ depends the reliability (reflected by "w") of the data and also the learning rate of the equipment (η). In some embodiments, the adaptive-learning algorithm uses the weight (W) to reflect the reliability of collected process monitor data and the learning rate coefficient (η) to determine how fast the sensitivity matrix should be revised.

The adaptive learning of the sensitivity coefficients (and intercept, such as $a_4$ in equation (5)) $a_{i,new}$ may use data from different equipment that are similar, such as etch tools, and serve the same function, such as via etch, in accordance with some embodiments. For equipment that has significant system to system variation, adaptive-learning can be based on individual system. Such adaptive learning takes system variation into consideration and is very useful in determining process parameters that would work for the individual system.

The adaptive-learning of the sensitivity matrix enables better prediction (or determination) of process parameters to dial into the equipment (or system) to obtain process monitors that would be within the monitor specifications. The operation 207 of FIG. 2A includes MIMO optimization that takes adaptive sensitivity matrix into consideration, in accordance with some embodiments, which would be more effective in determining process parameters. In some embodiments, the MIMO optimization does uses sensitivity matrix that is not adaptive. Such process is still faster than the conventional method of manual tuning.

Figure 4:
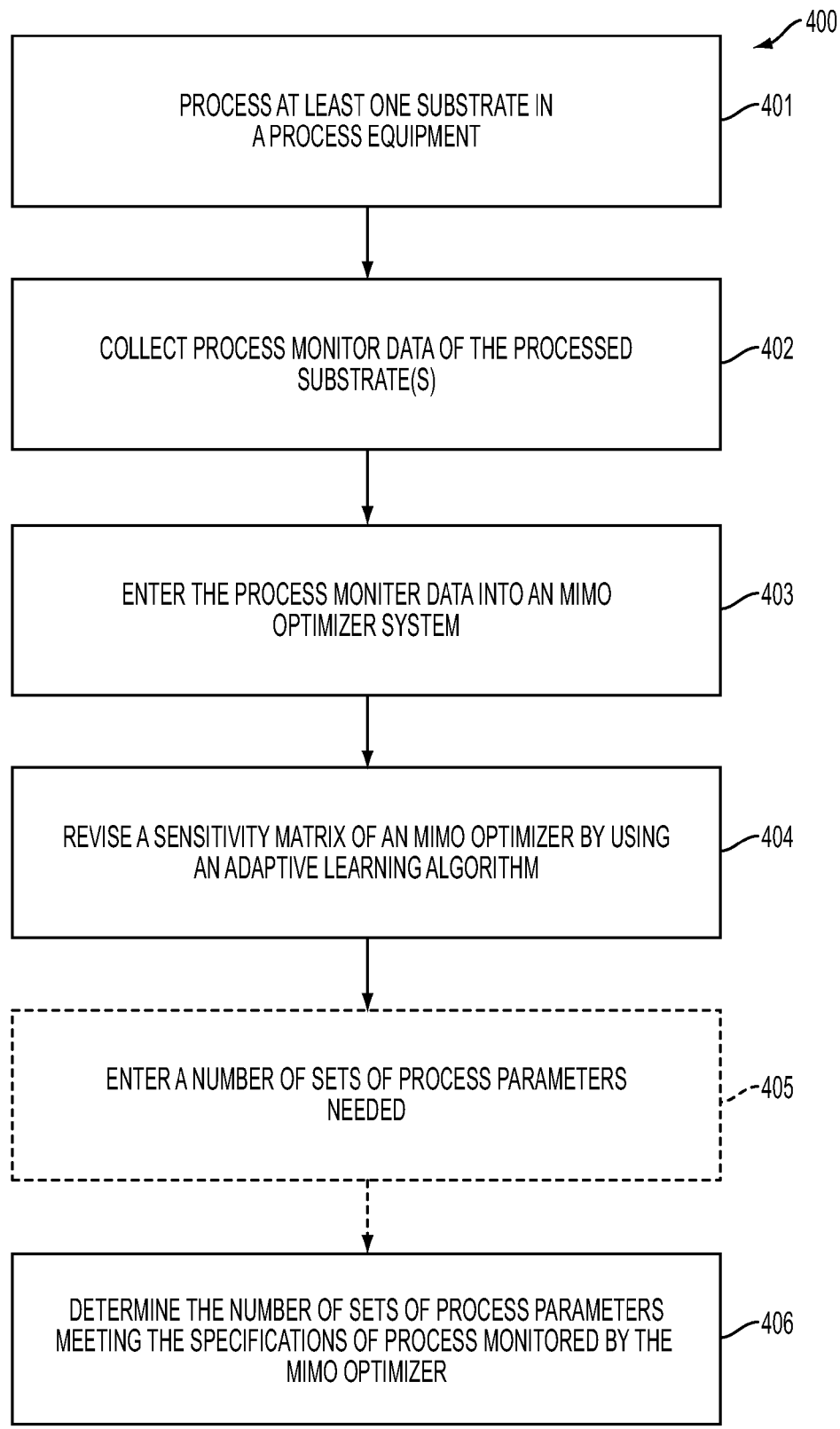
FIG. 4 shows a process flow of determining process parameters to qualify process equipment, in accordance with some embodiments.

FIG. 4 shows a process flow 400 of determining process parameters to qualify process equipment for production (or to control process monitors to be within specifications), in accordance with some embodiments. At operation 401, at least one substrate is processed in the process equipment. As mentioned above, the process equipment has just undergone some maintenance. In some embodiments, the process parameters used for processing the substrate(s) are the same as the process parameters used prior to the maintenance. In some other embodiments, the process parameters used for processing the substrate(s) are pre-set for the equipment, i.e. the process parameters are pre-determined for the equipment. For example, when the pre-set process parameters could be specified by the equipment vendor as system starting parameters.

At operation 402, process monitor data are collected from the processed substrate(s). As mentioned above, the process monitor data (or process monitors) measures characteristics of the substrate(s) after processing to determine the performance of the process equipment. Afterwards, entering the process monitor data into an MIMO optimization system at operation 403 (or the MIMO optimization system automatically receives the process monitor data). At operation 404, the sensitivity matrix of an MIMO optimizer in the MIMO optimization system is modified by incorporating the latest process monitor data by using an algorithm, such as the adaptive-learning algorithm described above. At an optional operation 405, the user may enter a number of sets of process parameters that is needed (or a number of sets of process parameters needed is received by a system). For example, 2, 3, 4, or 5, etc., sets of choices (process parameter4s) needed for the user to choose from. After the number is entered, at operation 406, the MIMO optimizer computes to determine process parameters (a number of sets) that meet or substantially meet the specification of process monitors of the process equipment. Operations 403 to 406 may occur in operation 207 of FIG. 2A, in accordance with some embodiments. Operations 403 and 404 described above reflect the process involved in adaptive-learning, in accordance with some embodiments.

Figure 5:
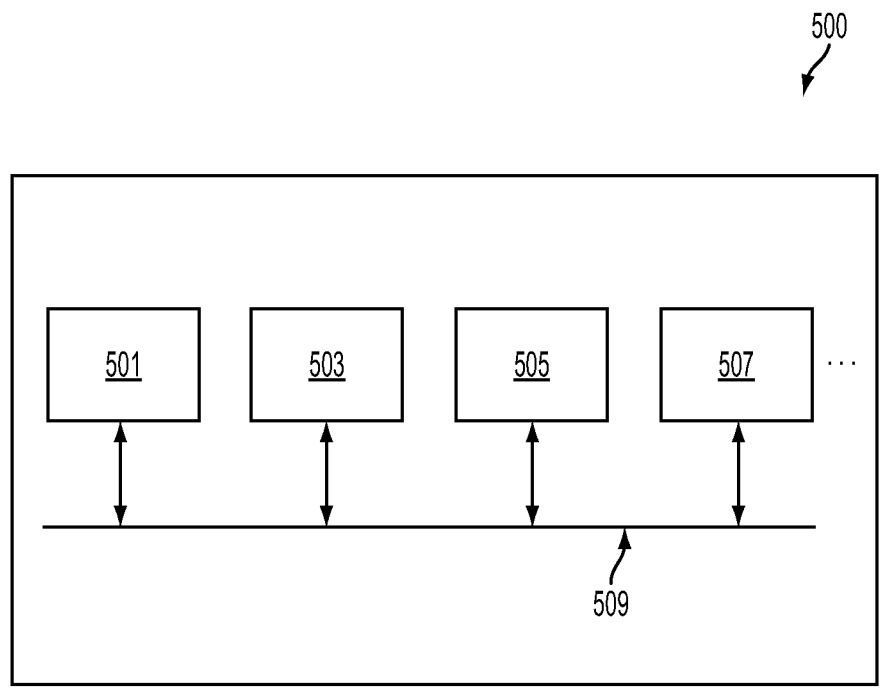
FIG. 5 shows a computer system, in accordance with some embodiments.

FIG. 5 shows a computer system 500, which may implement the embodiments of methods described above, in accordance with some embodiments. FIG. 5 shows one configuration of computer system 500 that includes at least one programmable processor 501 coupled to a memory subsystem 503. The memory subsystem 503 includes at least one form of memory, e.g., RAM, ROM, etc. The computer system may include a storage subsystem 505, which has at least one disk drive and/or CD-ROM drive and/or DVD drive. In some implementations, a display system, a keyboard, and a pointing device may be included as part of a user interface subsystem 507 to provide for a user to manually input information. Ports for inputting and outputting data also may be included. Other elements such as network connections, interfaces to various devices, etc., may also be included. The various elements of the computer system 500 may be coupled in various ways, including via a bus subsystem 509. The memory of the memory subsystem 503 may at some time hold part or all of a set of instructions that when executed on the computer system 500 implement the steps of the method embodiments described herein.

The embodiments of methods and systems described above could be applied to semiconductor equipment. All semiconductor equipment with multiple process parameters and process monitors may benefit from such embodiments. Examples of semiconductor equipment include, but are not limited to, equipment for deposition, etching, planarization, lithography, dopant implant, annealing, or cleaning of semiconductor substrates. The embodiments may also apply to processing equipment not related to semiconductor. Any processing equipment with multiple tunable process parameters and process monitors may benefit from the methods and systems described.

As described above, manufacturing equipment needs to be regularly shut down to be maintained for improving proves control and replacing old/failed parts. After maintenance, the manufacturing equipment need to be started up again and be qualified to be in production. Restarting and qualifying a tool could be quite challenging and time-consuming for advanced manufacturing.

The embodiments of methods and systems described above provide mechanisms for improving efficiency in qualifying processing equipment. By using a MIMO optimizer to identify tunable process parameters for processing equipment, the time and effort used in qualifying the systems may be reduced. Using the MIMO optimizer also reduces the reliance on human experience and individual affects on tuning the process parameters. An adaptive-learning algorithm may be utilized to taken system to system affect and current system performance into consideration to further improve the determination process for process parameters.

In one embodiment, a method of automatically determining process parameters for processing equipment is provided. The method includes processing at least one substrate in the processing equipment, and collecting process monitor data of the at least on substrate after processing is complete. The method also includes receiving the collected process monitor data by a multiple-inputs-multiple-outputs (MIMO) optimization system. The method further includes revising a sensitivity matrix used by a MIMO optimizer of the MIMO optimization system using the collected process monitor data and an adaptive-learning algorithm. In addition, the method includes determining at least a set of process parameters by the MIMP optimizer, wherein the MIMO optimizer uses the revised sensitivity matrix.

In another embodiment, a method of qualifying processing equipment is provided. The method includes operation (1) of processing at least one substrate in the processing equipment, and operation (2) of collecting process monitor data of the at least on substrate after processing is complete. The method also includes operation (3) of determining if the collected process monitor data are within specifications of process monitors. If the answer is yes, the method determines that the process equipment is qualified for production. If the answer is no, the method proceeds to determining at least a set of process parameters by a multiple-inputs-multiple-outputs (MIMO) optimizer. The method further includes returning to operation (1) of processing at least one substrate until the processing equipment is qualified.

In another embodiment, a computer-readable storage medium embodying instructions for performing a method of automatically determining process parameters for processing equipment is provided. The computer-readable storage medium includes instructions for processing at least one substrate in the processing equipment, and instructions for collecting process monitor data of the at least on substrate after processing is complete. The computer-readable storage medium also includes instructions for receiving the collected process monitor data by a multiple-inputs-multiple-outputs (MIMO) optimization system. The computer-readable storage medium further includes instructions for revising a sensitivity matrix used by a MIMO optimizer of the MIMO optimization system using the collected process monitor data and an adaptive-learning algorithm. In addition, the computer-readable storage medium includes instructions for determining at least a set of process parameters by the MIMP optimizer, wherein the MIMO optimizer uses the revised sensitivity matrix.

In yet another embodiment, a computer-readable storage medium embodying instructions for performing a method of qualifying processing equipment is provided. The computer-readable storage medium includes instructions for processing at least one substrate in the processing equipment, and instructions for collecting process monitor data of the at least on substrate after processing is complete. The computer-readable storage medium also includes instructions for determining if the collected process monitor data are within specifications of process monitors. If the answer is yes, the process equipment is qualified for production, and if the answer is no, the method proceeds to the operation with instructions for determining at least a set of process parameters by a multiple-inputs-multiple-outputs (MIMO) optimizer, wherein the MIMO optimizer. The computer-readable storage medium further includes instructions for returning the method to the operation with instructions for processing at least one substrate, for collecting process monitor data, and instructions for determining if the collected process monitor data are within specifications described above until the processing equipment is qualified.

Various modifications, changes, and variations apparent to those of skill in the art may be made in the arrangement, operation, and details of the methods and systems disclosed. Although the foregoing embodiments have been described in some detail for purposes of clarity of understanding, it will be apparent that certain changes and modifications may be practiced within the scope of the appended claims. Accordingly, the present embodiments are to be considered as illustrative and not restrictive. Further, the embodiments are not to be limited to the details given herein, but may be modified within the scope and equivalents of the description.

The invention claimed is:

1. A method of automatically determining process parameters for processing equipment, said method comprising:

processing at least one substrate in the processing equipment;

collecting data on process monitors for the at least one substrate after processing is completed;

receiving the collected data by a multiple-input-multiple-output (MIMO) optimization system;

revising a sensitivity matrix used by a MIMO optimizer of the MIMO optimization system using the collected data and an adaptive-learning algorithm, wherein the adaptive-learning algorithm minimizes a filtered energy function, wherein an energy function of the filtered energy function is defined to be the square of a difference between a simulated value of a process parameter and a predicted value of the process parameter, and wherein the adaptive-learning algorithm revises the sensitivity matrix by determining a new set of sensitivity coefficients for the revised sensitivity matrix; and determining a set of process parameters for the processing equipment by the MIMO optimizer, wherein the MIMO optimizer uses the revised sensitivity matrix to determine the process parameters.

2. The method of claim 1, wherein the sensitivity matrix includes linear relationships between multiple said process monitors and multiple said process parameters of the processing equipment; and wherein the process monitors are outputs of the MIMO optimizer and the process parameters are inputs of the MIMO optimizer.

3. The method of claim 1, further comprising: defining an optimization object function of the MIMO optimizer to minimize the sum of absolute values of differences between the collected data on the process monitors and their corresponding specifications, wherein the absolute values are weighted.

4. The method of claim 3, wherein the optimization object function includes a penalty term that gives different weights to changes in different process parameters.

5. The method of claim 1, wherein the MIMO optimizer includes constraints for the process parameters and/or the process monitors.

6. The method of claim 1, wherein the MIMO optimizer uses Newton's method, genetic method or simulated annealing method.

7. The method of claim 1, further comprising:
receiving a request for a number of sets of process parameters.

8. The method of claim 1, wherein the adaptive-learning algorithm uses a weight to reflect the reliability of the collected data on the process monitors and a learning rate coefficient to determine how fast the sensitivity matrix is revised.

9. The method of claim 1, wherein the filtered energy function is an exponentially weighted moving average (EWMA) of the energy function.

10. A method of qualifying processing equipment for production, said method comprising:

(1) processing at least one substrate in the processing equipment;

(2) collecting data on process monitors for the at least one substrate after processing is completed;

(3) determining if the collected data are within specifications of the process monitors,
if the answer is yes, determining that the processing equipment is qualified for production, and
if the answer is no, determining a set of process parameters for the processing equipment by a multiple-input-multiple-output (MIMO) optimizer; and repeating (1)-(3) until the processing equipment is qualified.

11. The method of claim 10, further comprising:
revising a sensitivity matrix used by the MIMO optimizer using the collected data and an adaptive-learning algorithm, wherein the revised sensitivity matrix is used in said determining the set of process parameters.

12. The method of claim 10, wherein the method is practiced after the processing equipment undergoes a maintenance process.

13. The method of claim 10, wherein the processing equipment is selected from the group consisting of deposition, etching, planarization, lithography, dopant implant, annealing, or cleaning equipment for semiconductor fabrication.

14. A non-transitory computer-readable storage medium embodying instructions for causing, when executed by a processor, the processor to perform a method of automatically determining process parameters for processing equipment, said medium comprising:

instructions for causing the processing equipment to process at least one substrate;

instructions for collecting data on process monitors for the at least one substrate after the substrate has been processed by the processing equipment;

instructions for revising a sensitivity matrix used by a MIMO optimizer using the collected data and an adaptive-learning algorithm, wherein the adaptive-learning algorithm is configured to minimize a filtered energy function, wherein an energy function of the filtered energy function is configured to be defined as the square of a difference between a simulated value of a process parameter and a predicted value of the process parameter, and wherein the adaptive-learning algorithm is configured to revise the sensitivity matrix by determining a new set of sensitivity coefficients for the revised sensitivity matrix; and instructions for determining a set of process parameters for the processing equipment by the MIMO optimizer, wherein the MIMO optimizer uses the revised sensitivity matrix to determine the process parameters.

15. The non-transitory computer-readable storage medium of claim 14, further comprising:
instructions for receiving a request for a number of sets of process parameters.

16. The non-transitory computer-readable storage medium of claim 14, wherein the sensitivity matrix includes linear relationships between multiple said process monitors and multiple said process parameters of the processing equipment; and wherein the process monitors are outputs of the MIMO optimizer and the process parameters are inputs of the MIMO optimizer.

17. The non-transitory computer-readable storage medium of claim 14, further comprising instructions for defining an optimization object function of the MIMO optimizer to minimize the sum of absolute values of differences between the collected data on the process monitors and their corresponding specifications.

18. A non-transitory computer-readable storage medium embodying instructions for causing, when executed by a processor, the processor to perform a method of qualifying processing equipment for production, said medium comprising:

first instructions for causing the processing equipment to process at least one substrate;

second instructions for collecting data on process monitors for the at least one substrate after the substrate has been processed by the processing equipment;

third instructions for determining if the collected data are within specifications of the process monitors, and for, if the answer is yes, determining that the process equipment is qualified for production, and if the answer is no, determining a set of process parameters for the processing equipment by a multiple-input-multiple-output (MIMO) optimizer, and repetitively performing the first through third instructions until the processing equipment is qualified.

19. The non-transitory computer-readable storage medium of claim 18, further comprising:

instructions for revising a sensitivity matrix used by the MIMO optimizer using the collected data and an adaptive-learning algorithm, wherein the revised sensitivity matrix is used in said determining the set of process parameters.

20. The method of claim 1, wherein the adaptive-learning algorithm determines the filter energy function based on a degree of reliability of the simulated value.

* * * * *